United States Patent
Baker et al.

(10) Patent No.: US 8,542,757 B2
(45) Date of Patent: Sep. 24, 2013

(54) EFFICIENT CQI SIGNALING IN MIMO SYSTEMS WITH VARIABLE NUMBERS OF BEAMS

(75) Inventors: Matthew Peter John Baker, Canterbury (GB); Timothy James Moulsley, Caterham (GB)

(73) Assignees: Koninklijke Philips N.V., Eindhoven (NL); Sharp Corporation, Osaka (JP)

( * ) Notice: Subject to any disclaimer, the term of this patent is extended or adjusted under 35 U.S.C. 154(b) by 674 days.

(21) Appl. No.: 12/439,001

(22) PCT Filed: Aug. 28, 2007

(86) PCT No.: PCT/IB2007/053439
§ 371 (c)(1),
(2), (4) Date: Feb. 26, 2009

(87) PCT Pub. No.: WO2008/026152
PCT Pub. Date: Mar. 6, 2008

(65) Prior Publication Data
US 2009/0323839 A1    Dec. 31, 2009

(30) Foreign Application Priority Data

Aug. 28, 2006  (EP) ..................................... 06119652
Sep. 15, 2006  (EP) ..................................... 06120720

(51) Int. Cl.
*H04L 27/28*    (2006.01)

(52) U.S. Cl.
USPC ........... 375/260; 375/220; 375/267; 375/299; 375/340; 375/347; 455/69; 455/101; 455/132; 455/500; 455/522; 455/562.1; 370/334; 370/335; 370/342; 370/464; 341/173; 341/180

(58) Field of Classification Search
USPC ................. 375/220, 260, 267, 299, 340, 347; 455/69, 101, 132, 500, 522, 562.1; 370/334, 370/335, 342, 464; 341/173, 180
See application file for complete search history.

(56) References Cited

U.S. PATENT DOCUMENTS

| | | | |
|---|---|---|---|
| 7,929,633 B2 * | 4/2011 | Seo et al. ....................... | 375/267 |
| 2004/0014429 A1 * | 1/2004 | Guo ................................ | 455/73 |
| 2004/0042427 A1 * | 3/2004 | Hottinen ........................ | 370/335 |
| 2005/0064872 A1 | 3/2005 | Osselran et al. | |
| 2005/0181739 A1 | 8/2005 | Krasny et al. | |
| 2006/0023624 A1 | 2/2006 | Han et al. | |
| 2006/0072677 A1 | 4/2006 | Kwak et al. | |
| 2006/0079221 A1 | 4/2006 | Grant et al. | |

FOREIGN PATENT DOCUMENTS

| | | |
|---|---|---|
| WO | 2005032154 A2 | 4/2005 |
| WO | 2006103758 A1 | 10/2006 |

\* cited by examiner

*Primary Examiner* — Leon Flores

(57) ABSTRACT

The present invention relates to the signaling of channel quality information in a multi-beam transmission system, wherein a plurality of sets of channel quality information are transmitted for controlling the transmission rate on one of the beams, wherein each set of channel quality information is derived dependent on an assumed parameter of at least one other beam which could be transmitted, comprising selecting a parameter of the transmission of each of the sets of channel quality information dependent on the assumed parameter of the at least one other beam.

19 Claims, 1 Drawing Sheet

EFFICIENT CQI SIGNALING IN MIMO SYSTEMS WITH VARIABLE NUMBERS OF BEAMS

FIELD OF THE INVENTION

The present invention relates to a method for signaling channel quality information in a multi-beam transmission system, in particular a multi-beam MIMO (multiple-in/multiple-out) system. Further, the present invention relates to a multi-beam transmission system, in particular a multi-beam MIMO system, wherein the number of beams simultaneously transmitted may vary and a plurality of sets of channel quality information (CQI) are transmitted for controlling independently the transmission rate of at least one beam dependent on the number of beams simultaneously transmitted. Moreover, the present invention relates to a computer program product for carrying out the afore-mentioned method.

The present invention can be applied in multi-antenna communication systems. In particular, a potential application of the present invention is in the MIMO feature currently being standardized for UMTS (universal mobile telecommunication system) Release 7.

BACKGROUND OF THE INVENTION

In the third generation partnership project (3GPP) a proposal called D-TxAA is under discussion for UMTS as a way of increasing the peak bit rate. This is derived from an existing closed loop transmit diversity scheme (TxAA mode 1) where the mobile terminal signals to the network complex weights which should be applied to the signals from each of two transmitting antennas. In D-TxAA two different data streams are transmitted using orthogonal weight vectors, wherein a first weight vector is based on those transmitted from the mobile terminal, and a second vector is derived deterministically from the first vector.

For the operation of D-TxAA, the following may be assumed:

Orthogonal pilot channels are transmitted from an antenna of each Node B (which is a logical node responsible for radio transmission and reception in one or more cells to and from a user equipment (UE)).

No dedicated (i.e. beam formed) pilots are available (assuming that the fractional dedicated physical channel (F-DPCH) is used, which does not carry pilot bits).

Feedback information (FBI) for the first beam is derived by the user equipment (UE) and transmitted to Node B, indicating a desired beam forming vector.

The first beam is transmitted using a restricted code book of weight vectors (for example the codebook currently used for TxAA mode 1).

The identity of the antenna weight vector for a first beam is signaled to the UE on the High-Speed Shared Control Channel (HS-SCCH).

The second beam, if used, is transmitted using a deterministic phase vector which is orthonormal to the vector for the first beam.

Channel quality information (CQI) is signaled by the UE to the Node B, enabling the Node B to derive a different rate for each beam.

The CQI typically indicates the rate (or packet size) which can be transmitted successfully (or with a given probability of success) using a reference power level and code resource (the reference values being known by both the network and the mobile terminal).

The transmissions on the two beams are comprised of separate codewords with potentially different rates.

In D-TxAA systems the number of beams transmitted may vary. Typically the base station selects a number of beams to transmit to a mobile station in each sub-frame, according to the prevailing situation, such as the radio channel conditions. This selection may be carried out based on the CQI reports received from a mobile station. In UMTS Release 5, a single CQI value is comprised of 5 information bits, coded into 20 physical channel bits. If many different CQI values have to be transmitted, this can result in a high signaling load.

SUMMARY OF THE INVENTION

An object of the present invention is to reduce the CQI signaling load in multi-beam systems.

In order to achieve the above and further objects, in accordance with a first aspect of the present invention, there is provided a method for signaling channel quality information in a multi-beam transmission system, in particular a multi-beam MIMO system, wherein a plurality of sequences of channel quality information values are transmitted for controlling the transmission rate on one of the beams, wherein each sequence of channel quality information values is derived dependent on an assumed parameter of at least one other beam which could be transmitted, comprising selecting a parameter of the transmission of each sequence of the plurality of sequences of channel quality information values dependent on the assumed parameter of the at least one other beam.

In accordance with a second aspect of the present invention, there is provided a computer program for carrying out the method according to the first aspect of the present invention.

In accordance with a third aspect of the present invention, there is provided a multi-beam transmission system, in particular a multi-beam MIMO system, wherein a plurality of sequences of channel quality information values are transmitted for controlling the transmission rate on one of the beams, wherein each sequence of channel quality information values is derived dependent on an assumed parameter of at least one other beam which could be transmitted, comprising selecting a parameter of the transmission of each sequence of the plurality of sequences of channel quality information values dependent on the assumed parameter of the at least one other beam.

The present invention leads to a reduction of the CQI signaling load in multi-beam transmission systems. This advantage is achieved by the fact that according to the present invention the signaling overhead of CQI for the different numbers of beams which may be transmitted may be reduced by appropriate selection of a parameter of the transmissions of each se sequence of the plurality of sequences of CQI values, without significantly degrading system performance.

Further advantageous embodiments are defined below.

BRIEF DESCRIPTION OF THE DRAWINGS

The invention will now be described, by way of example, with reference to the accompanying drawings, wherein.

DESCRIPTION OF PREFERRED EMBODIMENTS

Figure 1:
FIG. 1 shows a sequence of CQI values according to one embodiment of the present invention.

The transmission rate that can be supported by a beam may depend on whether other beams are also being transmitted simultaneously, and if so, with what parameters.

Therefore it is useful for the mobile station to transmit multiple sequences of CQI values for a beam, each sequence being derived in accordance with an assumption regarding which other beams will be transmitted simultaneously.

However, this can result in a high signaling overhead. The invention therefore provides a means for reducing the overhead by setting different parameter values for the different sequences of CQI values corresponding to a beam depending on the assumed number of other simultaneously-transmitted beams.

In a preferred embodiment, the mobile station transmits a first sequence of CQI values to indicate the transmission rate that could be supported on a first beam if no other beams are transmitted simultaneously.

Alternatively, the mobile station transmits a first sequence of channel quality information values to indicate a transmission rate that is supported on the first beam if a second beam is transmitted simultaneously using an assumed set of parameters.

The mobile station also transmits a second sequence of CQI values to indicate the transmission rate that could be supported on the first beam if a second beam is transmitted simultaneously using an assumed set of parameters which may for example have been signaled or predetermined. The mobile station may also transmit further sequences of CQI values to indicate the transmission rates that could be supported on the first beam if the second beam was transmitted with different sets of parameters, and/or to indicate the transmission rates that could be supported on the first beam if further beams were transmitted with the same or different sets of parameters. According to the invention, at least one transmission parameter of each sequence of the plurality of sequences of CQI values is adapted depending on one or more of the assumed set of parameters.

In preferred embodiments, the transmission parameter of each sequence of the plurality of sequences of CQI values may for example be one or more of the following:
  the rate of update of the CQI reports in the sequence,
  the resolution of the CQI reports in the sequence,
  the coding scheme of the CQI report in the sequence,
  the transmission power or modulation scheme used for the CQI reports in the sequence.

The second and further sequences of CQI values may be transmitted using differential signaling with respect to the another sequence of CQI values (for example the first sequence).

The assumed set of parameters on which basis the transmission parameter of each sequence of the plurality of sequences of CQI values is adapted may for example be one or more of the following:
  the number of beams assumed to be transmitted,
  the identity of the second beam or another beam, or beams to be transmitted,
  the identity of the intended receiving station for the second beam or another beam, or beams to be transmitted, for example whether the intended receiving station for another beam or beams is the same as the mobile station transmitting the sequences of CQI values or is a different mobile station,
  the transmission power of one or more of the beams.

In one embodiment, therefore, shown by way of example in FIG. 1, a first sequence of CQI values (10) corresponding to a first beam is transmitted periodically, where the CQI values in the first sequence are derived by the mobile station under the assumption that no other beams are transmitted simultaneously with the first beam.

A second sequence of CQI values (20) corresponding to the first beam is also transmitted periodically, where the CQI values in the second sequence are derived by the mobile station under the assumption that a second beam is transmitted simultaneously with the first beam. The transmission parameter of each sequence of the plurality of sequences of CQI values, which is in this example the update rate of the CQI values in the sequence, is set to a lower value than the value of the transmission parameter used for the first sequence of the plurality of sequences of CQI values.

Figure 2:
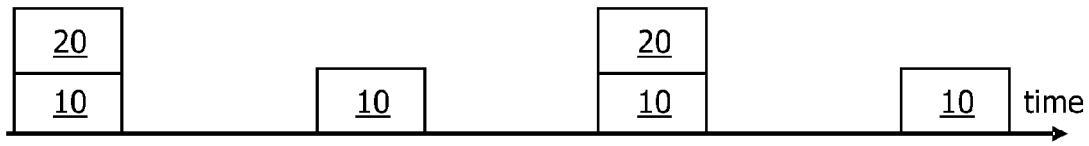
FIG. 2 shows a sequence of CQI values according to another embodiment of the present invention.

Another embodiment is shown by way of example in FIG. 2, where the transmission of the CQI values of the second sequence (20) coincides with the transmission of the CQI values of the first sequence (10).

The CQI values of the second sequence may comprise differential quantities relative to the preceding or average value of the first sequence.

The setting of a lower update rate for the second sequence of CQI values (20) can take advantage of the recognition that the difference caused to the CQI values for a beam by varying the number of simultaneously-transmitted beams can arise more from the receiver architecture of the mobile station than from the radio channel conditions. As the receiver architecture of the mobile station is likely to be more static than the radio channel conditions, the signaling overhead may be reduced by setting a lower update rate for the second sequence of CQI values.

In case the assumed set of parameters on which basis the transmission parameter of each sequence of the plurality of sequences of CQI values is adapted comprises the identity of the intended receiving station for another beam or beams, adapting a transmission parameter of each sequence of the plurality of sequences of CQI values has the advantage that a still further improved efficiency is obtained, in that the overall amount of energy and/or transmission resources spent on updating CQI is decreased. For example, the frequency or rate of updating the CQI values may be chosen to be higher for the CQI values that are derived under the assumption that a second beam is transmitted to the same mobile station than for the CQI values that are derived under the assumption that a second beam is transmitted to a different mobile station. This may be based on the fact that the second beam is more usually transmitted to the same mobile station than to a different mobile station, and therefore a higher update rate for the CQI values that assume that the second beam is transmitted to the same mobile station is more often useful for the base station ("Node B") when setting the appropriate transmission rate. In general, the mobile station would only take into account beams transmitted to other mobile stations if they are transmitted using the same time, frequency and code resources and are therefore separable only in the spatial domain. This aspect of the invention is based on the recognition that the CQI values reported for the first beam may take a different value depending on whether the second beam is assumed to be transmitted to the same mobile station or to a different mobile station. For example, if the mobile station has an interference-cancelling receiver, and it assumes that the second beam will be transmitted to the same mobile station, it may choose to report a lower CQI value for the first beam in order to improve the probability of cancelling the interference caused by the first beam to the second beam, thereby enabling a higher CQI value to be reported for the second beam so as to maximize the sum of the transmission rates that can be received on the two beams. However, if the mobile station assumes that the second beam will be transmitted to a different mobile station, it may report a higher CQI value for the first beam, as there is then no need to cancel interference caused to the second beam. The difference between these two CQI values for the first beam may typically change less frequently than the absolute values of the individual CQI values, and therefore according to the invention one of the two CQI values may be updated less frequently than the other, giving an advantage in reduced signaling overhead.

Figure 3:
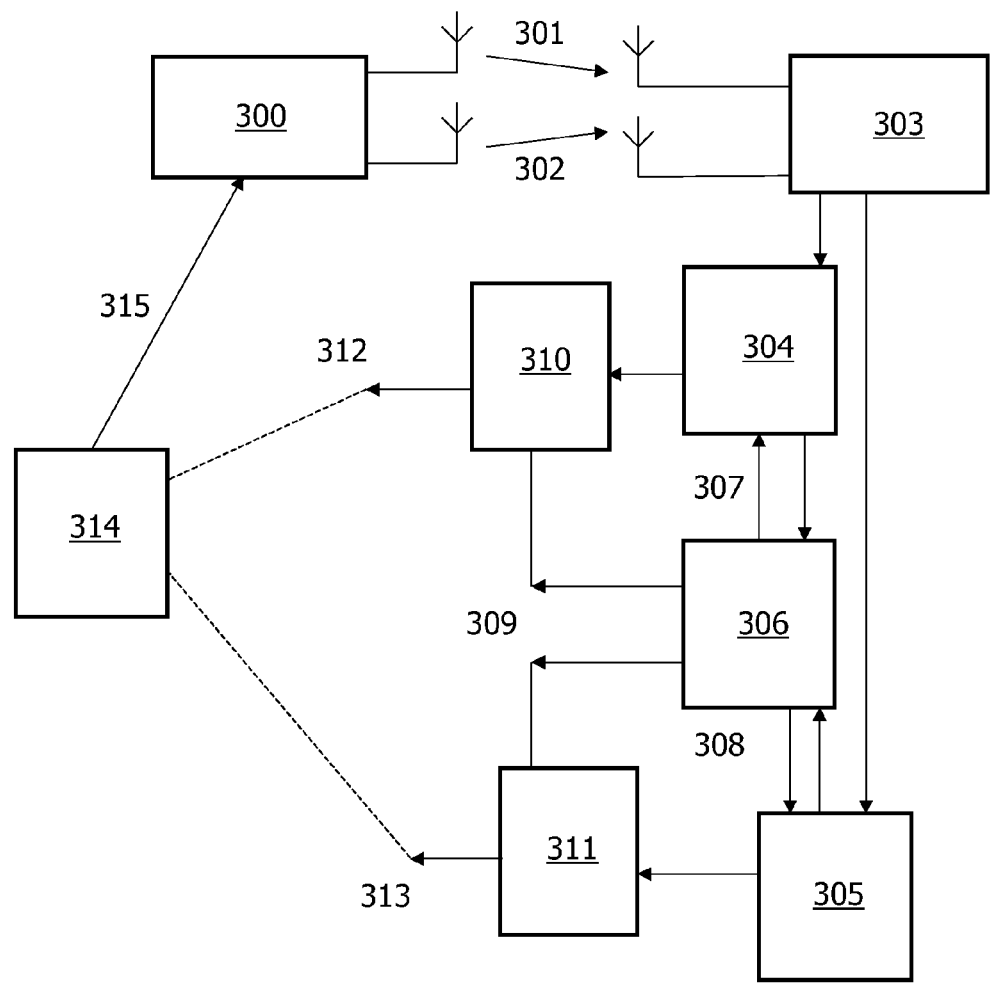
FIG. 3 shows a signaling of channel quality information in a multi-beam transmission system according to one embodiment of the present invention.

FIG. 3 shows a signaling of channel quality information in a multi-beam transmission system according to one embodiment of the present invention. On the side of a base station, a transmitter 300 transmits a plurality of beams 301, 302 to a receiver 303 on the side of a mobile station simultaneously. In the present embodiment two beams 301, 302 are shown as being transmitted simultaneously. Once the receiver 303 has received the beams 301, 302 channel quality estimators 304, 305 analyze the quality of the transmission on the corresponding beams. Thus, the first channel quality estimator 304 analyzes the quality of the transmission on the first beam 301, and the second channel quality estimator 305 analyzes the quality of the transmission on the second beam 302. A control unit 306 can be provided to exchange data comprising beam assumptions derived by the channel quality estimators 304, 305. These beam assumptions comprise assumed transmission parameters with regard to the corresponding beams. Thus, a set of assumptions or assumed transmission parameters, respectively, is provided by the corresponding channel quality estimators with regard to the corresponding beams. In FIG. 3, the control unit 306 exchanges first beam assumptions with the first channel quality estimator 304 and second beam assumptions with the second channel quality estimator 305.

Further, CQI sequence units 310, 311 are provided to generate or derive CQI sequences based on the corresponding beam assumptions. A CQI for any given beam depends on transmissions made on other beams. According to the present embodiment, different CQI values are transmitted for each combination of transmitted beams. In FIG. 3, a first CQI sequence 312 is generated by a first CQI sequence unit 310 by use of information provided by the first channel quality estimator 304 and, in particular, by use of a set of parameters for CQI sequences 309 provided by the control unit 306. The set of parameters for CQI sequences 309 is derived or generated by the control unit 306 in dependence on the assumptions 307, 308 provided by the channel quality estimators 304, 305. A second CQI sequence 313 is generated by a second CQI sequence unit 311 by use of information provided by the second channel quality estimator 305 and, in particular, by use of the set of parameters for CQI sequences 309. The first CQI sequence 312 may indicate a transmission rate that is supported on the first beam 301 if no other beams are transmitted simultaneously or a transmission rate that is supported on the first beam 301 if the second beam 302 is transmitted simultaneously using the assumed set of parameters 309. The second CQI sequence 313 indicates a transmission rate that is supported on the first beam 301 if the second beam 302 is transmitted simultaneously using the assumed set of parameters 309. Both CQI sequences 312, 313 are transmitted to a control unit 314 on the side of the base station, wherein the control unit 314 analyzes the CQI sequences 312, 313 received and representing channel quality information for each combination of transmitted beams and generates or derives beam transmission parameters 315. The beam transmission parameters 315 are, thus, generated by considering transmission quality information of all beams, the transmission quality information being transmitted in an efficient way due to the sets of parameters selected by the control unit. For the next transmission from the base station side to the mobile terminal side, the whole variety of channel quality of the plurality of simultaneously transmitted beams from the transmitter 300 to the receiver 303 will be considered when using the beam transmission parameters 315 provided by the control unit 314.

Although the invention has been described primarily in relation to transmissions from base stations to mobile terminals, the invention is also applicable to transmissions from mobile terminals to base stations, and between peer nodes.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the art of radio communication and which may be used instead of or in addition to features already described herein.

The invention claimed is:

1. A method of operating a communication system, said method comprising signaling channel quality information (CQI) in a multi-beam transmission system, wherein a number of beams simultaneously transmitted may vary, said method further comprising:

transmitting a plurality of sequences of channel quality information values for controlling transmission rate on at least one of the beams, estimating channel quality by analyzing quality of transmission of each of the number of beams via a plurality of channel quality estimators; and deriving each sequence of the plurality of sequences of CQI values based on an assumed parameter of each of the number of beams, each sequence depending on transmissions made on other beams of the number of beams, wherein said plurality of sequences includes at least a first sequence of channel quality information values, which assumes no other beams being transmitted, and a second sequence of channel quality information values, which assumes at least one other beam being transmitted, said second sequence of channel quality including at least one value lower than any of those in said first sequence of channel quality.

2. The method according to claim 1, said method comprising selecting a parameter of the transmission of each sequence of the plurality of sequences of channel quality information values.

3. The method according to claim 2, wherein a parameter of a sequence of the plurality of sequences of channel quality information values is at least one of the following:

a rate of update of channel quality information reports in the sequence;

a resolution of the channel quality information reports in the sequence;

a coding scheme of a channel quality information report in the sequence;

a transmission power or modulation scheme used for the channel quality information reports in the sequence.

4. The method according to claim 1, wherein the first sequence of channel quality information values to indicate a transmission rate that is supported on a first beam if no other beams are transmitted simultaneously; and the first sequence of channel quality information values indicate a transmission rate that is supported on the first beam if a second beam is transmitted simultaneously using an assumed set of parameters.

5. The method according to claim 4, wherein the second sequence of channel quality information values indicate a transmission rate that is supported on the first beam if a second beam is transmitted simultaneously using an assumed set of parameters.

6. The method according to claim 4, wherein further sequences of channel quality information values indicate transmission rates supported on the first beam if the second beam was transmitted with one of: different sets of parameters, and indicate the transmission rates supported on the first beams if one or more further beams were transmitted with same or different sets of parameters.

7. The method according to claim 5, wherein the second sequence of the plurality of sequences of channel quality information values and further sequences of channel quality information values are transmitted by use of differential signaling with respect to another sequence of the plurality of sequences of channels quality information values.

8. The method according to claim 5, wherein the assumed set of parameters comprises at least one of the following:
a number of beams assumed to be transmitted;
an identify of the second beam or another beam or beams to be transmitted;
an identity of an intended receiving station for the second beam or another beam or beams to be transmitted,
the transmission power of at least one of the beams.

9. The method according to claim 5, wherein a transmission of the second sequence of the plurality of sequences of the CQI values coincides with a transmission of the CQI values of the first sequence.

10. A multi-beam transmission system, wherein said system comprises:
means for:
transmitting a plurality of sequences of channel quality information values (CQI) for controlling the transmission rate on one of the beams; and
estimating channel quality by analysing quality of transmission of each of the number of beams via a plurality of channel quality estimators; wherein each sequence of the plurality of sequences of channel quality information values is derived based on an assumed parameter of each of the number of beams, each sequence depending on transmission made on other beams of the number of beams, wherein said plurality of sequences includes at least a first sequence of channel quality information values, which assumes no other beams being transmitted, and a second sequence of channel quality information values, which assume at least one other beam being transmitted, said second sequence of channel quality including at least one value lower than any of those in said first sequence of channel quality.

11. The multi-beam transmission system according to claim 10, comprising selecting a parameter of the transmission of each sequence of the plurality of sequences of channel quality information values.

12. A mobile station for use in a multi-beam transmission system according to claim 10, wherein:

the first sequence of CQI values indicate a transmission rate supported on a first beam if no other beams are transmitted simultaneously; and
the first sequence of CQI values indicate a transmission rate supported on the first beam if a second beam is transmitted simultaneously using an assumed set of parameters.

13. The mobile station according to claim 12, wherein the second sequence of CQI values indicate a transmission rate supported on the first beam if the second beam is transmitted simultaneously using an assumed set of parameters.

14. The mobile station according to claim 12, wherein further sequences of said plurality of CQI values indicate transmission rates supported on the first beam if the second beam was transmitted with one of: different sets of parameters and indicate transmission rates supported on the first beam if further beams were transmitted with the same or different sets of parameters.

15. The mobile station according to claim 12, wherein said mobile station is configured to take into account beams transmitted to other mobile stations if they are transmitted using the same time, frequency and code resources.

16. The mobile station according to claim 12, wherein the CQI values reported for the first beam will have a different value depending on whether the second beam is assumed to be transmitted to a same or different mobile station as the first beam.

17. The mobile station according to claim 16, wherein the second beam is transmitted to the same mobile station as the first beam and wherein the mobile station reports a lower CQI value for the first beam, thereby enabling a higher CQI value to be reported for the second beam.

18. The mobile station according to claim 17, wherein the second beam is transmitted to a different mobile station than the first beam and wherein the mobile station reports a higher CQI value for the first beam than for the second beam.

19. A computer program stored on a non-transitory computer readable medium for executing the steps; comprising:
signalling channel quality information in a multi-beam transmission system, wherein a number of beams simultaneously transmitted may vary, said method further comprising:
transmitting a plurality of sequences of channel quality information values for controlling transmission rate on at least one of the beams;
estimating channel quality by analysing quality of transmission of each of the number of beams via a plurality of channel quality estimators; and
deriving each sequence of the plurality of sequences of CQI values based on an assumed parameter of each of the number of beams, each sequence depending on transmission made on other beams of the number of beams, wherein said plurality of sequences includes at least a first sequence of channel quality information values, which assumes no other beams being transmitted, and a second sequence of channel quality information values, which assume at least one other beam being transmitted, said second sequence of channel quality including at least one value lower than any of those in said first sequence of channel quality.

* * * * *